United States Patent

Duck

[15] 3,683,405

[45] Aug. 8, 1972

[54] MAGNETIC DEFORMATION RECORDING

[72] Inventor: Sherman W. Duck, Alhambra, CA

[73] Assignee: Bell & Howell Company, Chicago, Ill.

[22] Filed: June 17, 1970

[21] Appl. No.: 47,065

[52] U.S. Cl.......346/74 TP, 178/6.6 TP, 340/173 TP, 346/77 E

[51] Int. Cl.............................G11b 7/00, H04n 5/82

[58] Field of Search.346/74 TP, 74 ES, 74 MP, 77 E; 178/6.6 TP; 340/173 TP

[56] References Cited

UNITED STATES PATENTS

| | | | |
|---|---|---|---|
| 3,262,122 | 7/1966 | Fleisher et al | 340/173 TP |
| 2,738,383 | 3/1956 | Herr et al | 179/100.2 E |
| 3,250,636 | 5/1966 | Wilferth | 346/74 MP |
| 3,213,429 | 10/1965 | Schwertz | 178/6.6 TP |

*Primary Examiner*—Howard W. Britton
*Assistant Examiner*—Gary M. Hoffman
*Attorney*—Luc P. Benoit

[57] ABSTRACT

A method of recording information provides, in a deformable magnetic recording medium, deformed portions representative of the information, and magnetizes these deformed portions differently from other portions of the magnetic recording medium so as to establish a magnetic record of the information.

12 Claims, 19 Drawing Figures

INVENTOR.
SHERMAN W. DUCK
BY
[signature]
ATTORNEY

INVENTOR.
SHERMAN W. DUCK
BY
ATTORNEY

INVENTOR.
SHERMAN W. DUCK
BY
ATTORNEY

MAGNETIC DEFORMATION RECORDING

CROSS-REFERENCE TO RELATED APPLICATION

Subject matter disclosed in the present invention is claimed in the copending patent application, Ser. No. 47,064, filed June 17, 1970 by Joseph Gaynor, and assigned to the present assignee.

BACKGROUND OF THE INVENTION

1. Field of the Invention

The present invention relates to the art of information recording, reproduction and printout with the aid of deformable magnetic recording media.

2. Description of the Prior Art

Information recording by plastic film deformation has received considerable attention in recent years because of its promise as an imaging technique, its inherent processing simplicity and its erasure capability (see Dessauer and Clark, XEROGRAPHY, (The Focal Press, 1965) pp. 375–89, and passim [hereinafter referred to as Dessauer and Clark] and Schaffert, ELECTROPHOTOGRAPHY, (The Focal Press, 1965), pp. 35–37 [hereinafter referred to as Schaffert]).

Despite its many advantages, plastic deformation recording has received practically no commercial application to date; mainly because duplication and readout of the recorded information are not easily accomplished,and no efficient and reliable printout has been possible so far.

SUMMARY OF THE INVENTION

The subject invention overcomes these disadvantages and, from one aspect thereof, resides in a method of recording information, comprising in combination the steps of providing a deformable magnetic recording medium including a material retaining a magnetic moment upon magnetization thereof providing in this magnetic recording medium deformed portions representative of the information, providing a pattern of magnetic gradients, and magnetically copying this magnetic gradient pattern into the magnetic recording medium so that the deformed portions are magnetized differently from other portions of the magnetic recording medium, whereby a magnetic record of the information is established.

From another aspect thereof, the subject invention resides in a method of recording information, comprising in combination the steps of providing a deformable magnetic recording medium including a material retaining a magnetic moment upon magnetization thereof, magnetizing this deformable magnetic recording medium by recording a line pattern of magnetic gradients on said magnetic recording medium, and providing in this magnetized recording medium deformed portions representative of the information whereby a magnetic record of the information is established.

BRIEF DESCRIPTION OF THE DRAWINGS

The invention will become more readily apparent from the following detailed description of preferred embodiments thereof, illustrated by way of example in the accompanying drawings, in which.

Figure 1A:
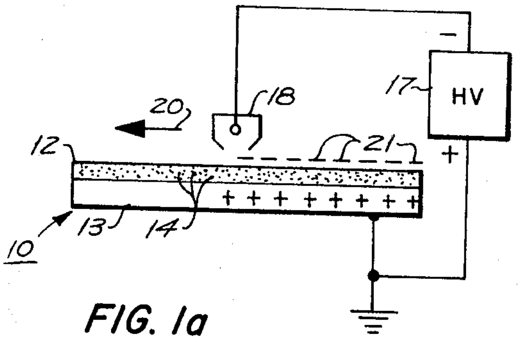
FIGS. 1*a* through 1*c* constitute a flow sheet of an information recording process in accordance with a preferred embodiment of the invention disclosed in the above mentioned copending patent application by Dr. Gaynor.

In the accompanying drawings, like reference numerals among the various figures designate like or functionally equivalent parts. To avoid cumbersome repetition, a part which appears in two or more figures of the drawing is typically described hereinafter with reference to one of these figures. The description of that one figure should then be consulted for a fuller understanding of the nature and function of that part in all the figures in which it appears.

DESCRIPTION OF PREFERRED EMBODIMENTS

The deformable magnetic recording medium 10 illustrated in FIG. 1a comprises a layer 12 of thermoplastic material disposed on an electrically conductive substrate 13, and particles 14 of ferromagnetic material dispersed throughout the layer 12.

A large and expanding body of literature exists on plastic-deformation information recording, and constitutes a copious source of data and know-how on the composition and constitution of suitable thermoplastic material layers 12. By way of example and not by way of limitation, suitable materials for the layer 12 include acetates, acrylics, polyesters, silicones, and vinyl resins having a substantially infinite room temperature viscosity and a substantially fluid viscosity temperature of 100° to 150° C., together with a high electrical resistivity permitting an at least temporary retention of electric charges by the layer 12. Preferred resistivities for the layer 12 are about $10^{15}$ ohm-cm and higher.

Mixtures of thermoplastic organic polymers may be employed for the layer 12, and a satisfactory mixture for this purpose includes by way of example and not by way of limitation, a blend of polystyrene, m-terphenyl, and the copolymer of 95 wt. percent of butadiene with 5 wt. percent of styrene, in the ratios of 70 percent polystyrene, 28 percent m-terphenyl, and 2 percent of the copolymer.

Information on these and further materials for the deformable layer 12 may for instance be obtained from U.S. Pat. No. 3,291,601, Process of Information Storage on Deformable Photoconductive Medium, by Josepf Gaynor, issued Dec. 13, 1966, U.S. Pat. No. 3,400,382. Thermoplastic Recording Medium, by F. Kurzweil, Jr., issued Sept. 3, 1968 or U.S. Pat. No. 3,413,146, Thermoplastic Recording Medium, by R. H. Anderson and P. Levine, issued Nov. 26, 1968.

The thermoplastic material in the form of the layer 12 is deposited on the electrically conductive substrate 13, which, by way of example, may be a foil of a metal, such as aluminum, chromium or nickel, or a foil of plastic material (e.g., a film base material of the type sold by E. I. duPont de Nemours and Company under their registered trademarks Mylar and Cronar) having a film of a metal or electrically conductive metal compound, such as aluminum, tin, chromium, nickel, stannic oxide, or cuprous oxide deposited thereon (see the above mentioned U.S. Pat. No. 3,291,610).

The thickness of the deformable layer is more a matter of good practice than of critical limitation. As a broad guide, it is good practice to make the layer 12 at least as thick as the desired minimum distance between information-representative deformations to be recorded, and several times as thick as the mean size of the magnetic particles 14.

Suitable materials for the particles 14 in the layer 12 include nickel, cobalt, or hard iron, or compounds such as gamma ferric oxide or magnetite ($Fe_3O_4$), as well as ferromagnetic iron, nickel or cobalt compounds or any material that substantially retains a magnetic moment upon magnetization thereof.

The particles 14 are typically intermixed with the material of the layer 12 before the same is applied to the substrate 13.

The concentration of the particles 14 in the layer 12 is low enough to preclude electrical contact between the particles which, if present, would interfere with an electric charge deposition or retention on the layer 12. If the particles 14 are electrically conducting on their surface, they may be coated with an electrically insulating material prior to their incorporation in the layer 12.

The electrically conductive substrate 13 is in FIG. 1*a* connected to a grounded terminal of a source 17 of high-voltage electric energy. An electrostatic corona charger 18 is connected to the other terminal of the high-voltage source 17.

The corona charger 18 is moved relative to the recording medium 10 as indicated by the arrow 20, so that charges 21 are deposited on the recording medium 10. In the embodiment shown in FIGS. 1*a* to 1*c*, no information modulation is imposed on the charge deposition. It can thus be said that the charge deposition according to FIG. 1*a* is uniform with the understanding that the term "uniform" is intended to be broad enough to cover also discontinuous charge patterns, such as line patterns, as long as these are not information-modulated. Also, while negative charges have been shown at 21 and corresponding positive charges at the electrode 13, these polarities may be reversed if desired.

Upon electrostatic charging the recording medium 10 is exposed to a thermal image 23 of the information to be recorded. According to the preferred embodiment illustrated in FIG. 1*b*, this is accomplished by directing infrared radiations 24 from a source of infrared radiations 25 against a master record 26 which has infrared opaque regions 28 and infrared transparent portions 29 arranged as to represent the information to be recorded.

By way of example, the master record 26 may include a transparent silver-halide photograph of an object. Other suitable master records include any opaque heat-resistance foil or sheet having cut-out portions 29, or any transparent heat-resistant foil or sheet having opaque portions 28 printed, painted or otherwise deposited thereon.

Figure 1B:
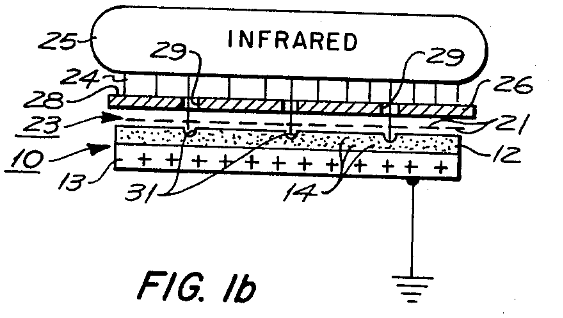
Figure 1C:
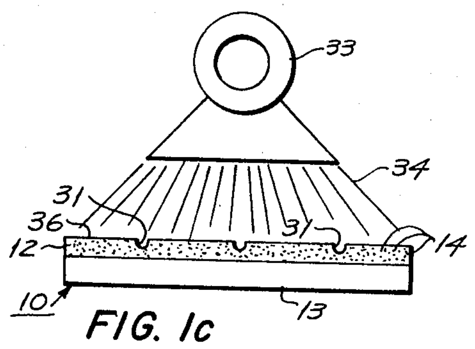

Infrared radiations penetrating the transparent record areas 29 and impinging on the magnetic recording medium 10 soften portions of the layer 12 sufficiently to permit electrostatic charges 21 to provide deformed portions 31 which are representative of the information to be recorded. In the illustrated preferred embodiment the deformed portions 31 constitute despressions in the layer 12. The deformation process shown in FIG. 1*b* is followed by a cooling step in which the depressions 31 are fixed in the layer 12. To this end FIG. 1*c* shows a fan structure 33 which directs a stream 34 of cold air to the top surface 36 of the medium 10. It should be understood in this connection that the cooling step for fixing the depressions 31 need not necessarily be brought about by the application of a coolant or by another deliberate removal of thermal energy from the layer 12. In many instances heat losses by the layer 12 to the environment will be sufficient to bring about the requisite cooling step.

It should be understood at this juncture that the deforming agency acting on the deformable magnetic recording medium may be magnetic rather than electrostatic. As disclosed in the above mentioned copending Gaynor patent application the deformable layer 12 may be softened and then subjected to a pattern of magnetic gradients so that particles 12 contract to form the information-representative depressions 31. Alternatively, the depressions 31 may be formed by subjecting the layer 12 simultaneously to a thermal image of the type shown in FIG. 1*b* and to magnetic fields.

The depressions having been provided electrostatically or magnetically, a magnetic record of the information is established in the medium 10. According to the preferred embodiment illustrated in FIGS. 2*a* through 2*c*, this is accomplished by copying a pattern of magnetic gradients 40 into the layer 12. The pattern of magnetic gradients is provided by the equipment diagrammatically illustrated in FIG. 2*a*.

Figure 2A:
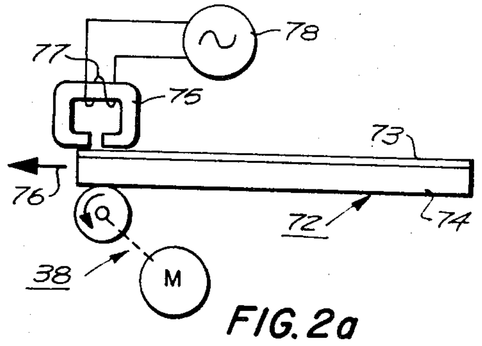
FIGS. 2*a* through 2*c* constitute a flow sheet of a magnetic recording process in accordance with a preferred embodiment of the subject invention.

According to FIG. 2*a*, a conventional magnetic recording medium 72 has magnetizable layers or a recording layer 73 provided on a substrate 74. The recording layer 73 has particles of a magnetic recording medium, such as an iron oxide (e.g., gamma ferric oxide), or ferromagnetic chromium dioxide dispersed in a binder matrix. A drive 38 moves the magnetic recording medium 72 relative to a conventional magnetic recording head 75 as indicated by an arrow 76. The magnetic recording head 75 has a winding 77 energized by a source 78 of alternating current so that a line pattern of magnetic gradients 40 (see FIG. 2*b*) is recorded on the medium 72.

Figure 2B:
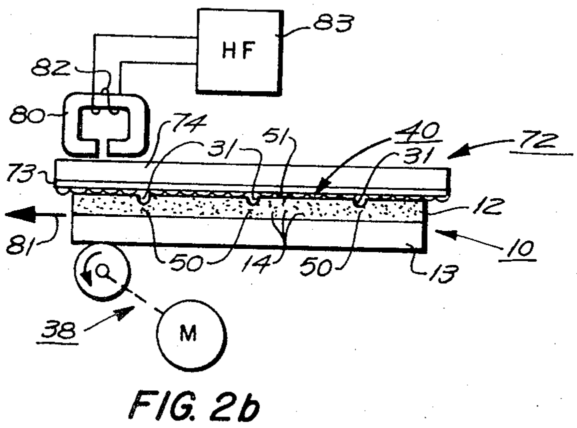

According to FIG. 2*b* the recording medium 72 with the magnetic gradient or line pattern 40 recorded thereupon is brought into contact with the medium 10 having the depression 31. These two media are thereupon moved by the drive 38 relative to a magnetic recording head 80, as indicated by an arrow 81. The magnetic head 80 has a winding 82 energized from a source 83 of high-frequency current, for the performance of an anhysteretic copying process of the type described, for instance, in U.S. Pat. No. 2,738,383, by R. Herr et al., issued Mar. 13, 1956, the specification and drawings of which are herewith incorporated by reference herein.

To this end, the medium 72 may have a higher coercivity than the particles 14 in the medium 10 and the magnetic recording head imposes an alternating magnetic field which travels along the media 10 and 72 and which has a peak intensity higher than the coercivity of the particles 14 but lower than the coercivity of the medium 72.

In this manner the magnetic line pattern on the medium 72 is copied on the medium 10. This copying effect is much stronger in the portions 51 which are in close proximity to the medium 72 than in the portions 50, below the depressions 31, which are spaced from the medium 72 by the depth of the depressions 31. Accordingly, the result of this magnetization operation is a magnetic record 53 (see FIG. 2*c*) in which strong magnetizations 54 stand in contrast to weak or negligible magnetization of the depressions 31.

If the presence of depressions 31 causes problems during a toning process, or during other stages of the handling of the recording medium 10, the recording medium with the magnetic record 53 may be exposed to the infrared source 25 of FIG. 1*b* so that the layer 12 is sufficiently softened by heat to permit surface tension to smooth out the depressions 31.

The magnetic record 53 can easily be duplicated, read out, and printed out. Duplication of the magnetic record 53 may for instance proceed by means of the well-known anhysteretic copying process in which a magnetic recording medium having a coercivity lower than that of the particles 14 is held against the layer 12, whereupon a high-frequency magnetic field is moved along these contacting media so that magnetic particles of the copy medium are successively subjected to anhysteretically decaying magnetic fields of a peak value higher than the coercivity of the copy medium but lower than the coercivity of the particles 14. An illustrative example of such a duplication process is shown in, and described below in connection with FIG. 4.

Figure 5:
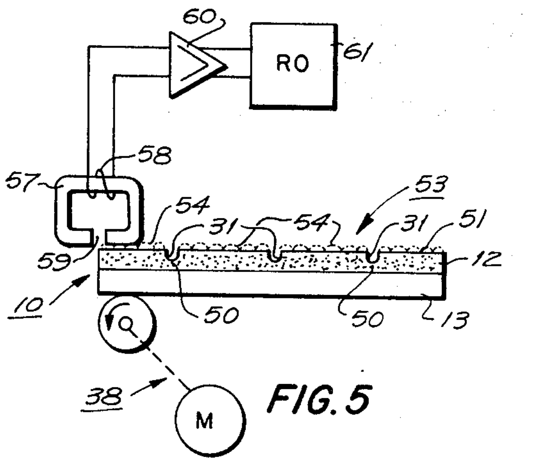
FIG. 5 illustrates a magnetic readout process.

Reverting to the magnetic record 53 shown in FIG. 2, equipment for reading out the magnetic record is shown in FIG. 5.

The readout equipment of FIG. 5 includes a magnetic playback head 57 which is moved relative to the medium 10 by a drive 38, and which has a winding 58 in which electrical signals are induced by the magnetic record 53. These electric signals correspond to magnetic gradients of the record 53 encountered by an air gap 59. The induced signals are amplified at 60 and fed into a readout system which may include display, storage or any other kind of equipment, depending on the contemplated use of the readout information.

Figure 3A:
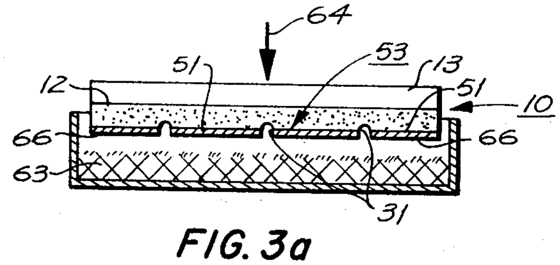
FIGS. 3*a* and 3*b* illustrate a printout process forming part of a preferred embodiment of the subject invention.
Figure 3B:
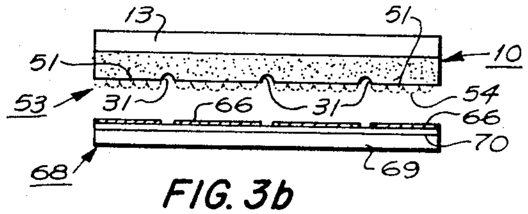

FIGS. 3*a* and 3*b* jointly illustrate a method and means for printing out the information record 53.

According to FIG. 3a the medium 10 is moved relatively to a supply of magnetic toner 63 as indicated by the arrow 64. Magnetic toner is well-known in the art of magnetic printing and may include particles of iron, nickel, cobalt or ferromagnetic compositions thereof. These ferromagnetic particles can be used as a magnetic toner for printout on tacky surface. If printing out on a dry surface is desired, the ferromagnetic particles are preferably suspended in a toning liquid or provided with shells of fusible material.

The subject invention may, if desired, be practiced with conventional liquid or dry magnetic toners. Suitable magnetic toners are, for instance, disclosed in U.S. Pat. No. 2,932,278, by J. C. Sims, issued Apr. 12, 1960, U.S. Pat. No. 2,943,908, by J. P. Hanna, issued July 5, 1960, and U.S. Pat. No. 3,250,636, by R. A. Wilferth, issued May 10, 1966.

Toner particles from the supply 63 are attracted by and tone the magnetic record 53 to provide a toner image 66 that is complementary to the image presented by the depressions 31. Since the magnetization in the depressions 31 is much weaker than the magnetization in the regions 51, toning of the depressions 31 during toning of the regions 51 is avoided. If desired or necessary, the medium 10 may be vibrated after toning in the upside-down position shown in FIG. 3*a* to assure a shaking of non-adhering particles out of the depressions 31, or the toned medium may be placed into proximity of a magnet (not shown) which will remove non-adhering particles from the depressions 31, while not being strong enough to pull adhering particles from the magnetized portions of the medium.

According to FIG. 3*b* the toner image 66 is printed on a printout medium 68 that may for instance be composed of a sheet of paper 69 that has a tacky surface 70 to which the toner image 66 adheres when the medium 10 is brought into close proximity to the printout medium 68, and by means of which the toner image 66 is pulled off the medium 10 when the printout medium is moved away from the magnetic record.

A major feature of the embodiments of the subject invention is the facility with which multiple prints are effected from a recorded image or other recorded information. Unlike electric charges, the magnetic record 53 does not decay with time, so that it is theoretically possible to produce an unlimited number of prints by magnetic toner printout techniques. A practical limit is, however, frequently imposed by wear and tear of the deformable magnetic recording medium in multiple printout operations. Where this drawback is found to exist, problems are easily avoided by means of the method and equipment illustrated in FIG. 4.

Figure 4:
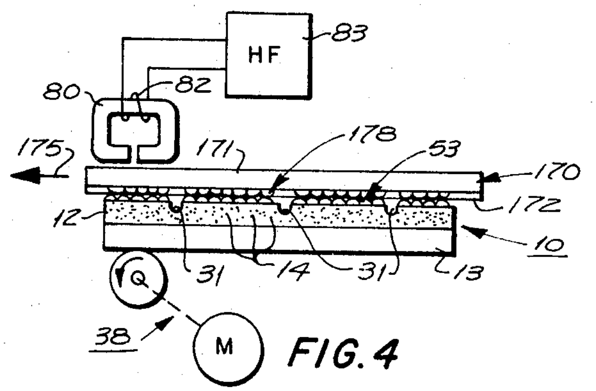
FIG. 4 illustrates a magnetic record copying process forming part of a preferred embodiment of the subject invention.

According to FIG. 4 the above mentioned drive 38 and anhysteretic magnetizations equipment 80, 82, and 83 are employed to copy the magnetic record 53 of the input image or information on a magnetic copy medium 170 by using, for example, the magnetic copying technique disclosed in the above mentioned U.S. Pat. No. 2,738,383, by R. Herr et al., the disclosure of which is herewith incorporated by reference herein.

The copy medium 170 has a conventional substrate 171 which bears a layer 172 including a magnetic recording material, such as gamma ferric oxide. To assure a copying of the magnetic record on the medium 170 without an erasure thereof on the medium 10, the magnetic recording materials in the layer 172 preferably has a lower coercivity than the magnetic particles 14 in the layer 12.

Figure 12:
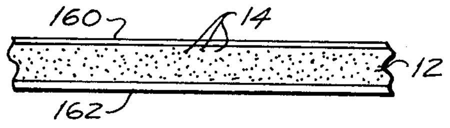
FIG. 12 illustrates a modified recording medium which may be employed in the practice of subject invention.

The medium 170 is placed adjacent to the medium 10, with the layer 172 preferably contacting the layer 12 (or the coating 160 of FIG. 12, if used). The drive 38 jointly advances the media 10 and 170 in the direction of arrow 175 past the magnetic recording head. The recording head 80 is as before energized by the high-frequency source 83 to provide the requisite anhysteretic transfer field at the layer 172 for a copying of the magnetic record 53 in the layer 172.

In this manner, a magnetic record 178 which is a copy of the magnetic master record 53 is provided on the copy medium 170. This copy record may then be employed for multiple readout and printout purposes. In this respect the media 10 and 170 jointly yield a result that by far exceeds the result that would be obtained by an implementation of the requisite properties in the layer 12 alone.

More specifically, if the magnetic record 52 is desired to be read out or printed out from the deformable magnetic recording medium itself, there typically exists a practical limit on the number of attainable readout or printout operations, since adequate thermal deformability and substantial mechanical surface wear resistance generally are mutually countervailing properties. A delegation of the multiple printout or readout of the magnetic record to the copy medium 170 frees the choice of the deformable medium 12 from overriding wear and tear considerations, so that an optimum material in terms of deformability, electrical properties and, if desired, reusability can be chosen. As a corollary, the selection of the material for the layer 172 on the copy medium is freed from considerations of deformability and electrical suitability, and a material of optimum wear and tear resistance and optimum thermal stability can be selected. By way of example, the layer 172 of the copy medium 170 may include magnetizable particles incorporated in a polyurethane binder, in a polyimide binder, or in a Teflon (polytetrafluoroethylene) matrix.

Figure 6:
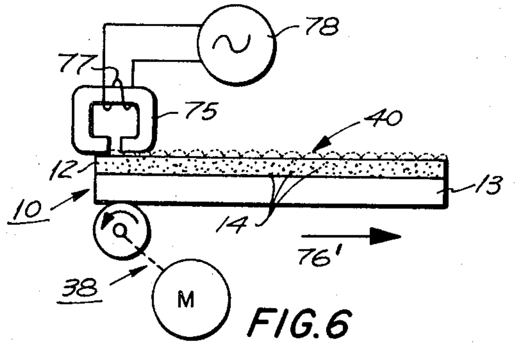
FIG. 6 illustrates a magnetization process forming part of a preferred embodiment of the subject invention.

A further preferred embodiment of the subject invention is illustrated with the aid of FIG. 6.

According to FIG. 6 the recording medium 10 is initially magnetized. To this end the drive 38 moves the recording medium 10 in the direction of an arrow 76' past the magnetic recording head 75. As in FIG. 2*a*, the magnetic recording head has a winding 77 energized by a source 78 of alternating current so that a line pattern of magnetic gradients 40 is recorded on the magnetic recording layer 12.

The information representative depressions are then provided in the magnetized recording medium 10 of FIG. 6. By way of example, the magnetized recording medium may be electrostatically charged as shown in FIG. 1a and thermally exposed as shown in FIG. 1*b* whereby a magnetic record of the input information is established. This magnetic record may be read out in the manner shown in FIG. 5, since the magnetized portions 50 below the depressions 31 are spaced further from the playback head 57, and thus give a weaker reading, than the magnetized regions 51 between or around the depressions 31.

Moreover, the latter magnetic record may be copied onto the further recording medium 170 in the manner shown and described in connection with FIG. 4. Readout or magnetic toner or ink printout may then take place from such further recording medium 170.

The embodiment of FIG. 6 has the further substantial advantage that electrostatic charging processes may be rendered unnecessary thereby. If the particles 14 are magnetized so that they magnetically attract or repell each other, a deformation of matrix portions will take place upon fluidization of these matrix portions in the manner shown in FIG. 1*b*.

By way of example, if adjacent particle groups are magnetized at alternating polarities, then these particle groups will be drawn together when the matrix is fluidized. If this fluidization is effected in the information-wise manner shown in FIG. 1b, then the information-representative depressions 31 will be formed.

The resulting magnetic record may again be readout, printed out, or copied as herein before described. A major advantage of the lack of electrostatic charging and imaging steps resides in the fact that such a lack renders considerations concerning electrical properties of the matrix 12 unnecessary. Accordingly, many materials that would not be suitable in electrostatic charging processes become suitable as matrix material in purely magnetic deformation methods.

Figure 7A:
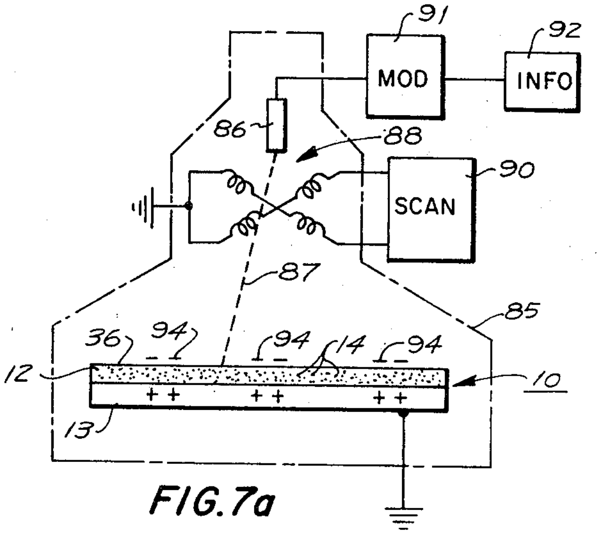
FIGS. 7*a* and 7*b* illustrate an alternative to the information recording process of FIG. 1.
Figure 7B:
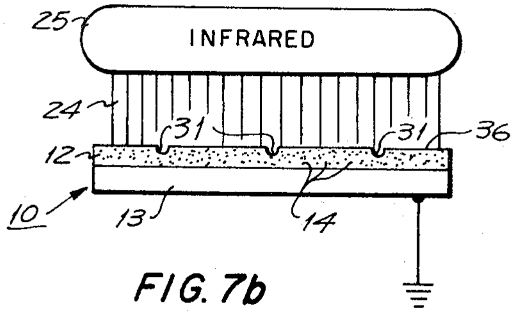

On the other hand, there are situations where electrostatic techniques are still desirable. By way of example, the embodiment illustrated in FIGS. 7*a* and 7*b* provides the information-indicative depressions 31 with the aid of an electric charge pattern that is representative of the information to be recorded. In other words, while the information input in the embodiment of FIGS. 1*a* and 1*c* was contained in a pattern of thermal gradients, it is now contained in a pattern of electrical charges.

To this end, the deformable recording medium 10 is located in an evacuated enclosure 85 which houses a conventional electron gun 86 for producing a beam of electrons 87 and a deflection system 88 for deflecting the beam.

The deflection system 88 is driven by a conventional scanner 90 which causes the electron beam 87 to scan the surface 36 of the deformable layer 12. The electron gun is driven by a conventional beam intensity control 91 which modulates the intensity of the electron beam 87 in response to the information to be recorded, as indicated by the block diagram 92. The result is a pattern 94 of electric charges which represents the information on the recording medium 10. An intensity-modulated electron beam system and a thermoplastic tape recorder readily adaptable to present purposes is described and illustrated in Glenn, *Thermoplastic Recording*, 30 J. Appl. Phys., No. 12, (Dec. 1959) pp. 1,870–73.

According to FIG. 7*b* the medium 10, having been provided with an electrostatic charge pattern as shown in FIG. 7*a*, is exposed to infrared radiations 24 from an infrared source 25 so that the deformable layer 12 is softened. The electrostatic charges in the pattern 94 shown in FIG. 7*a* thereupon act upon portions of the softened layer 12 and provide the depressions 31.

Figure 2C:
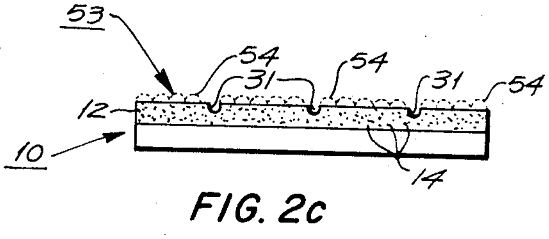

The medium 10 shown in FIG. 7*b* may thereupon be cooled as shown in FIG. 1*c* and magnetized as illustrated in FIGS. 2*a* and 2*b* to provide the magnetic record 53 shown in FIG. 2*c*, which may be utilized as described above. While the same materials as before may be employed in the medium 10 for the embodiment of FIGS. 7*a* and 7*b*, information on materials and techniques peculiar to electron beam recording may for instance be derived from Chang, *The Physical Parameters of a Thermoplastic Polymer Film in an Electron Beam Read/White System*, 12 Phot. Sc. and Engr., No. 5 (September–October 1968) pp. 238–43.

Figure 8A:
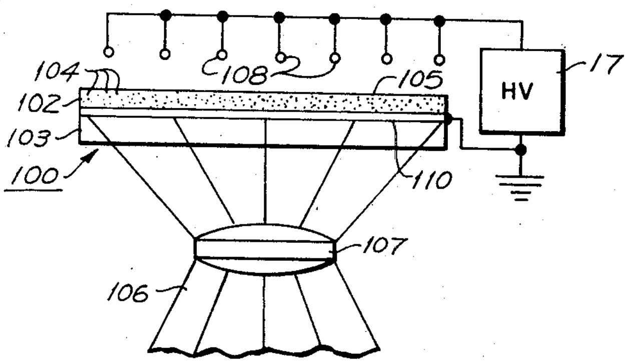
FIGS. 8*a*, 8*b*, 9, 10 and 11 illustrate other alternatives to the information recording process of FIG. 1.
Figure 8B:
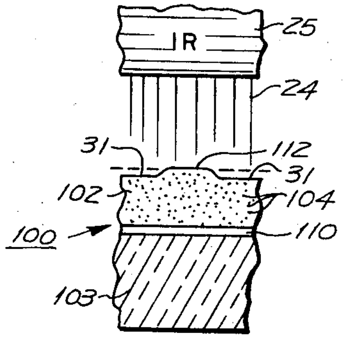

The embodiment illustrated in FIGS. 8*a* and 8*b* employs a special deformable magnetic recording medium 100 in accordance with a further preferred embodiment of the subject invention. The recording medium 100 includes a layer 102 of thermoplastic photoconductive material located on a transparent glass or organic substrate 103 and having ferromagnetic particles 104 incorporated therein. The ferromagnetic particles 104 may be of the same type as the above mentioned ferromagnetic particles 14, and electrical contact between these particles is again avoided as mentioned above in connection with the particles 14.

The thermoplastic photoconductive material in the layer 102 may, for instance, be of the type disclosed in the above mentioned U.S. Pat. No. 3,291,601 by Dr. Gaynor. The thermoplastic photoconductive material for the layer 102 may be prepared by synthesis of photoconductive, thermoplastic polymers and by solution or dispersion of organic or inorganic photoconductors in thermoplastic matrices, as described in Gaynor and Aftergut, *Photoplastic Recording*, 7 Phot. Sc. and Engr., No. 4 (July–August 1963), pp. 209–13. Further thermoplastic photoconductive materials are described in Aftergut, Bartfai and Wagner, *Photoplastic Recording Film Made with CdS*, J. Applied Optics, Suppl. No. 3, Electrophotography (1969), and Barfai, Ozarow and Gaynor, *Red-Sensitive Photoplastic Recording*, 10 Phot. Sc. and Engr., No. 1 (January–February 1966).

Electrostatic charges are applied to the layer 102 by a system of charging wires 108 which is connected to one terminal of a source 17 of high-voltage electric energy. The other terminal of the source 17 is grounded and connected to a conventional transparent electrode 110 deposited on the substrate 103 and sandwiched between this substrate and the layer 102 as shown in FIG. 8*a*. Alternatively, the corona charger 18 of FIG. 1*a* may be used for electrostatically charging the layer 102.

Suitable materials for the transparent electrode 110 include for example, the metals iron, chromium, nickel or tin; metallic oxides, such as stannic oxide and indium oxide; and metallic salts, such as copper sulfide and copper iodide.

After the photoconductive layer 102 has been charged, it is exposed to a luminous image 106 with the aid of a lens system 107. The photoconductor layer 102 becomes electrically conductive where it is hit by light. In consequence, charges can recombine at these locations to leave a charge pattern where no light hit the photoconductor layer 102.

As shown in FIG. 8*b*, the medium 100 is thereupon exposed to uniformly distributed infrared radiations 24 provided by the infrared source 25. As before, the information-representative pattern of charges provides a corresponding pattern of depressions 31. Where charges have been recombined by action of the photoconductor layer 102, a peak 112 remains. Upon magnetization of the layer 102 in the manner shown in FIGS. 2*a* and 2*b*, for instance, the peaks 112 are magnetized stronger than the valleys 31 so that a negative image of the luminous input 106 is obtained upon printout with a dark magnetic toner.

Figure 9:
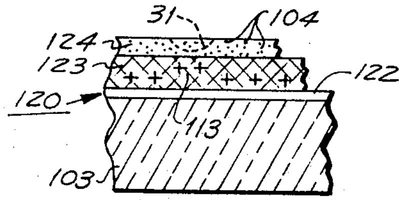

According to the embodiment of FIG. 9 a transparent substrate 103 of the above mentioned type carries a conventional transparent electrode 122 which corresponds to the electrode 110 in FIG. 8*a*. A sheet-like photoconductor 123 is deposited on the electrode 122. A sheet 124 of thermoplastic material is deposited on the photoconductor 123 and has the previously described ferromagnetic particles 104 dispersed therein.

Suitable examples of preferred materials for the sheet-like photoconductor 123 include cadmium sulfide, cadmium selenide, a photoconductive selenium tellurium alloy, sensitized zinc oxide or lead sulfide, dispersed in a binder of an electrically insulating material in a manner known per se.

The thermoplastic sheet 124 may be of the same material as the above mentioned sheet 12.

The medium 120 may be employed in the embodiment of FIGS. 8*a* and 8b in lieu of the medium 100 and is electrically charged by the corona charger 18 or charging wire arrangement 108. Where the photoconductor layer 123 is hit by light during its exposure to the input image 106, electric charges can flow from the electrode 122 to the lower surface of the thermoplastic sheet 104 as shown at 113. In consequence of the increased field strength, depressions 31 will occur at the location of the charges 113 when the layer 124 is exposed to the infrared radiations 24. If desired, the information-representative charges 113 may be intensified prior to heating of the thermoplastic layer. To this end, the medium 120 is again exposed to the action of the charging wire arrangement 108 or corona discharger 18, whereby the charge densities at the previously light-exposed areas are increased.

Information-representative depressions 31 having been formed, the layer 124 may be magnetized in the manner shown in FIGS. 2*a* and 2*b*, for instance. As before, the resulting magnetic information record 53 can be read out, duplicated, or printed out as described above. If the magnetic record is printed out with a dark magnetic toner, a positive print of the input image is obtained.

Figure 10:
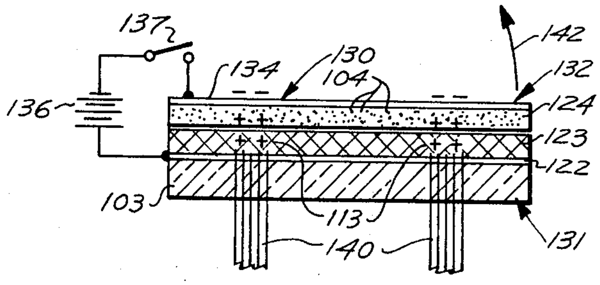

A further photosensitive embodiment is shown in FIG. 10. The composite magnetic recording medium 130 of FIG. 10 is composed of two mutually separable parts 131 and 132. The part 131 comprises the transparent substrate 103, transparent electrode 122 and sheet-like photoconductor 123 described above in connection with FIG. 9. The part 132, on the other hand, comprises the previously described sheet 124 of thermoplastic material and an electrode 134. The sheet 124 is deposited on the electrode 134 and includes the magnetizable particles 104. The electrode 134 may be of the same material as the previously described electrode 13.

The electrode 122 is connected to one terminal of a source 136 of electric current, while a switch 137 upon closure connects the electrode 134 to the other terminal of the source 136. In operation the parts 131 and 132 are positioned as shown in FIG. 10 and are pressed in mutual contact by such conventional means as spring clips, mounting members and the like (not shown). An intimate contact between the photoconductor sheet 123 and the thermoplastic sheet 124 is important for optimum charge transfer. In practice slight gaps between the sheets 123 and 124 are not always avoidable, and it may then be advisable or necessary to provide the source 136 with a high voltage of sufficient magnitude to assure a voltage breakdown for the desired charge transfer.

To initiate operation of the composite recording medium 130, the switch 137 is closed and the photoconductor sheet 123 is exposed to an input image. Where light stimuli 140 impinge upon the photoconductor, electric charges 113 flow toward the sheet 124 and transfer themselves onto the electrically insulating sheet 124. In this manner, an electric charge pattern corresponding to, or being representative of, the input information is provided on the deformable magnetic recording sheet 124.

The charged sheet 124 is then separated from the photoconductor assembly, as symbolically illustrated by the arrow 142. The sheet 124 may now be softened for a provision of information-representative depressions by such means as an exposure to infrared radiations according to FIG. 7*b*. A magnetic record of the type shown at 53 in FIG. 2*c* may then be established in the manner illustrated in FIGS. 2*a* and 2*b*.

A substantial advantage of the embodiment shown in FIG. 10 resides in the fact that the magnetic recording medium is separable from the photoconductor medium. In practice it will be found that the expense of the magnetic medium part 132 is typically several times lower than the expense of the photoconductor assembly part 131. If the part 132 is separable from the part 131, then significant overall savings can be realized by making the part 132 disposable.

Also, since the part 132 can be removed from the part 131, the thermoplastic sheet 124 can readily be subjected to any desired thermal treatment without fear of an adverse effect on the photoconductor sheet 123.

Figure 11:
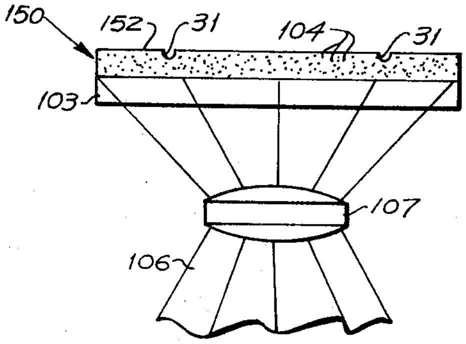

Another advantageous embodiment of the subject invention is obtained through the utilization of a deformable photovoltaic thermoplastic medium of the type described, for instance, in Gaynor and Sewell, *Photocharge Process*, 11 Phot. Sc. and Engr., No. 3 (May–June 1967). FIG. 11 illustrates this embodiment.

The deformable magnetic recording medium 150 of FIG. 11 has a layer 152 of magnetizable photovoltaic thermoplastic material deposited on the previously described transparent substrate 103. The layer 152 includes the above mentioned magnetizable particles 104, as well as a photovoltaic compound dissolved in a thermoplastic polymer. A preferred polymer is polystyrene having a molecular weight of about 20,000 and a melting point of 100° C. Other polymers or polymer blends having similar dielectric properties and melting temperatures and melt viscosities are also suitable.

The photovoltaic compound is preferably a polyhalogenated aliphatic hydrocarbon, such as iodoform, carbon tetrabromide, methylene iodide, and tetraiodoethylene. Aromatic amines, such as disphenylamine, triphenylamine or p-phenyl azoaniline, enhance both the sensitivity and spectral response.

The polymer and photovoltaic material are codissolved in an aromatic solvent; the ratio being about twenty to one by weight. Concentration of sentisizer is usually an order of magnitude lower than of the photovoltaic material.

To record an image, the film is preferably heated in the dark to recombine stray charges that may have accumulated. An input image 106 may then be projected through the transparent substrate 103 and onto the layer 152 by means of the lens 107. While the precise mechanism of the imaging is not yet fully understood, it is believed that an image exposure leads to a photochemical reaction in the layer 152 which gives rise to the generation of charge species; a cation and an electron, or an anion and a hole, distributed so as to be representative of the input image.

The layer 152 may then quickly be heated in the manner illustrated in FIG. 7*b* to provide the image or information-representative depressions 31. The layer 152 may then be magnetized in the manner illustrated in FIGS. 2*a* and 2*b* to provide a magnetic record of the image.

While the magnetization method of FIGS. 2*a* and 2*b* has been stressed in connection with the description of the embodiment of FIGS. 7*a* through 11, it should be understood that the premagnetization technique of FIG. 6 may be employed in these embodiments in the alternative to provide the formation of the magnetic record.

FIG. 12 illustrates a method for increasing the electrical chargeability of the deformable recording media so far described. According to FIG. 12, the above-mentioned medium 12, for instance, with included magnetizable particles 14, is provided with a first coating 160 of thermoplastic material and a second coating 162 of thermoplastic material. The coatings 160 and 162, between which the magnetic particles 14 are located, are preferably made of the same thermoplastic material as the layer 12, without any magnetic particles being, however, included in the coatings 160 and 162.

The medium illustrated in FIG. 12 may for example, be provided by applying the thermoplastic coating 162 to the above mentioned substrate 13. After cooling of the layer 162, the thermoplastic layer 12 with included magnetizable particles 14 is deposited on the layer 162. After cooling of the layer 12, the thermoplastic coating 160 is applied thereto to complete the desired deformable recording medium.

I claim:

1. A method of recording information, comprising in combination the steps of:

providing a deformable magnetic recording medium including a material retaining a magnetic moment upon magnetization thereof;

providing in said magnetic recording medium deformed portions representative of said information;

providing a pattern of magnetic gradients; and magnetically copying said magnetic gradient pattern into said magnetic recording medium so that said deformed portions are magnetized differently from other portions of said magnetic recording medium whereby a magnetic record of said information is established.

2. A method as claimed in claim 1, including the step of:

printing out said magnetic record with the assistance of magnetically attracted toner.

3. A method as claimed in claim 1, wherein:
said magnetic gradient pattern is copied into said recording medium by subjecting said recording medium to both said magnetic gradient pattern and to an anhysteretic magnetic transfer field so that said deformed portions are magnetized differently from other portions of said magnetic recording medium.

4. A method as claimed in claim 1, wherein:
said pattern of magnetic gradients is provided on a magnetizable layer;
said magnetizable layer is located in proximity of said deformed recording medium so that said magnetizable layer is more proximate to said other portions of the recording medium than to bottom regions of said deformed portions; and
said deformed magnetic recording medium is subjected to an anhysteretic magnetic transfer field so that said magnetic gradient pattern is copied into said magnetic recording medium.

5. A method as claimed in claim 1, wherein:
said information-representative deformed portions are provided with the aid of electrostatic forces.

6. A method as claimed in claim 1, wherein:
said information-representative deformed portions are provided with the aid of magnetic forces.

7. A method of recording information, comprising in combination the steps of:
providing a deformable magnetic recording medium including a material retaining a magnetic moment upon magnetization thereof;
magnetizing said deformable magnetic recording medium by recording a line pattern of magnetic gradients on said magnetic recording medium; and
providing in said magnetized recording medium deformed portions representative of said information whereby a magnetic record of said information is established.

8. A method as claimed in claim 7, including the steps of providing a magnetizable layer;
locating said magnetizable layer into proximity of said deformed, magnetized recording medium so that said magnetizable layer is spaced from said deformed portions differently than from other portions of said deformed, magnetized recording medium; and
subjecting said magnetizable layer to an anhysteretic magnetic transfer field so as to copy said magnetic record of said information onto said magnetizable layer.

9. A method as claimed in claim 7, wherein:
said information-representative deformed portions are provided with the aid of electrostatic forces.

10. A method as claimed in claim 7, wherein:
said information-representative deformed portions are provided with the aid of said recorded magnetic gradients.

11. A method as claimed in claim 7, including the step of
magnetically copying said magnetic record onto a further magnetic recording medium.

12. A method as claimed in claim 11, including the step of:
printing out said magnetic record from said further magnetic recording medium with the assistance of magnetically attracted toner.

* * * * *